(12) United States Patent
Katoh

(10) Patent No.: US 7,639,149 B2
(45) Date of Patent: Dec. 29, 2009

(54) AUTOMATIC LIGHTING DEVICE AND METHOD FOR CONTROLLING LIGHT

(75) Inventor: Toshiyuki Katoh, Nagoya (JP)

(73) Assignee: Denso Corporation, Kariya (JP)

( * ) Notice: Subject to any disclaimer, the term of this patent is extended or adjusted under 35 U.S.C. 154(b) by 322 days.

(21) Appl. No.: 11/786,735

(22) Filed: Apr. 12, 2007

(65) Prior Publication Data

US 2007/0285019 A1 Dec. 13, 2007

(30) Foreign Application Priority Data

May 9, 2006 (JP) .............................. 2006-130268

(51) Int. Cl.
| | |
|---|---|
| G08B 23/00 | (2006.01) |
| G08G 1/017 | (2006.01) |
| G08G 1/054 | (2006.01) |
| B60K 28/00 | (2006.01) |
| B60L 3/02 | (2006.01) |
| B60T 7/14 | (2006.01) |
| G03B 15/02 | (2006.01) |
| B60Q 1/00 | (2006.01) |
| F21V 21/28 | (2006.01) |
| F21V 21/29 | (2006.01) |
| B60Q 1/26 | (2006.01) |

(52) U.S. Cl. ....................... 340/576; 340/937; 180/272; 362/17; 362/18; 362/465; 362/487

(58) Field of Classification Search ................. 362/464, 362/487–490, 253, 276, 317, 372, 4, 5, 8, 362/16–18; 180/272; 340/937, 942, 933, 340/995.14–995.17, 438, 573.1, 576, 5.81–5.83, 340/426.24, 426.25

See application file for complete search history.

(56) References Cited

U.S. PATENT DOCUMENTS

| | | | | |
|---|---|---|---|---|
| 4,953,111 | A * | 8/1990 | Yamamoto et al. | 340/575 |
| 5,598,145 | A * | 1/1997 | Shimotani et al. | 340/576 |
| 5,734,357 | A * | 3/1998 | Matsumoto | 345/7 |
| 7,424,135 | B2 * | 9/2008 | Gifford et al. | 382/115 |
| 7,486,200 | B2 * | 2/2009 | Gerber | 340/903 |
| 2004/0105264 | A1 * | 6/2004 | Spero | 362/276 |
| 2007/0273492 | A1 * | 11/2007 | Hara et al. | 340/438 |

FOREIGN PATENT DOCUMENTS

| | | | |
|---|---|---|---|
| JP | 11-183181 | | 7/1999 |
| JP | 2003-291718 | | 10/2003 |
| JP | 2004182006 | * | 7/2004 |

* cited by examiner

*Primary Examiner*—Jennifer Mehmood
(74) *Attorney, Agent, or Firm*—Harness, Dickey & Pierce, PLC

(57) ABSTRACT

An automatic lighting device includes an illuminance detector for detecting an external illuminance around a vehicle, a light controller for turning on/off a vehicular light, a driver's characteristics detector for acquiring information about driver's physical characteristics, and a threshold setting element for setting the illuminance threshold in accordance with the driver's physical characteristics. The controller turns on the light when the external illuminance is not more than the illuminance threshold.

17 Claims, 7 Drawing Sheets

US 7,639,149 B2

AUTOMATIC LIGHTING DEVICE AND METHOD FOR CONTROLLING LIGHT

CROSS REFERENCE TO RELATED APPLICATION

This application is based on Japanese Patent Application No. 2006-130268 filed on May 9, 2006, the contents of which are incorporated herein by reference in its entirety.

BACKGROUND OF THE INVENTION

1. Field of the Invention

The present invention relates to an automatic lighting device which automatically turns on/off a vehicular light in accordance with an external illuminance. The present invention also relates to a method for automatically turning on/off a vehicular light in accordance with an external illuminance.

2. Description of the Related Art

Conventionally, an automatic lighting device (also called a light control system) which detects an illuminance surrounding a vehicle with a sensor and controls vehicular lights in accordance with a detecting illuminance is known (for example, JP-A-2003-291718). For example, in an automatic lighting device in the prior art, an illuminance sensor detects an external illuminance around a vehicle, and an ECU (Electronic Control Unit) turns on vehicular lights including head lamps and tail lamps when the external illuminance is not more than a certain illuminance threshold, and turns off the vehicular lights when the external illuminance is more than the illuminance threshold. In this way, the automatic lighting device turns on the vehicular lights automatically to help a driver when the vehicle enters a tunnel, and when it is getting dark at evening, for example.

A person having a light iris color normally does not need to turn on the vehicular lights until late night because he has an excellent night vision. A person having a dark iris color needs to turn on the vehicular lights even at early twilight because he has a less-excellent night vision.

However, the automatic lighting device in the prior art automatically turns on/off the vehicular lights at a certain external illuminance. Therefore, a timing of turning on/off the vehicular lights at twilight when the surrounding gradually becomes dark is not optimized for driver's physical characteristics such as night vision.

SUMMARY OF THE INVENTION

In view of the foregoing problems, it is an object of the present invention to provide an automatic lighting device which can automatically turn on/off vehicular lights at an appropriate timing in accordance with driver's physical characteristics. It is another object of the invention to provide a method for automatically turning on/off vehicular lights at an appropriate timing in accordance with driver's physical characteristics.

According to an aspect of the present invention, an automatic lighting device includes an illuminance detector for detecting an external illuminance around a vehicle, a light controller for turning on/off a vehicular light, a driver's characteristics detector for acquiring information about driver's physical characteristics, and a threshold setting element for setting the illuminance threshold in accordance with the driver's physical characteristics. The controller turns on the light when the external illuminance is not more than the illuminance threshold.

In the automatic lighting device, the driver's characteristics detector acquires the information about the driver's physical characteristics, and threshold setting element sets the illuminance threshold in accordance with the information about the driver's physical characteristics acquired with the driver's characteristics detector. The light controller turns on the vehicular lights when the external illuminance detected with the illuminance detector is not more than the illumination threshold set in accordance with the information about the driver's physical characteristics. Therefore, the automatic lighting device can turn on the vehicular lights at an appreciate timing in accordance with the driver's physical characteristics.

According to another aspect of the present invention, a method for controlling a vehicular light includes detecting an external illuminance around a vehicle, turning on the vehicular light when the external illuminance is not more than an illuminance threshold, acquiring information about driver's physical characteristics, and setting the illuminance threshold in accordance with the driver's physical characteristics.

According to the method, the vehicular lights can be automatically turned on in accordance with the driver's physical characteristics.

BRIEF DESCRIPTION OF THE DRAWINGS

Additional objects and advantages of the present invention will be more readily apparent from the following detailed description of preferred embodiment when taken together with the accompanying drawings. In the drawings.

DETAILED DESCRIPTION OF THE PREFERRED EMBODIMENTS

An automatic lighting device 1 according to an embodiment of the invention is described below with the accompanying drawings.

Figure 1:
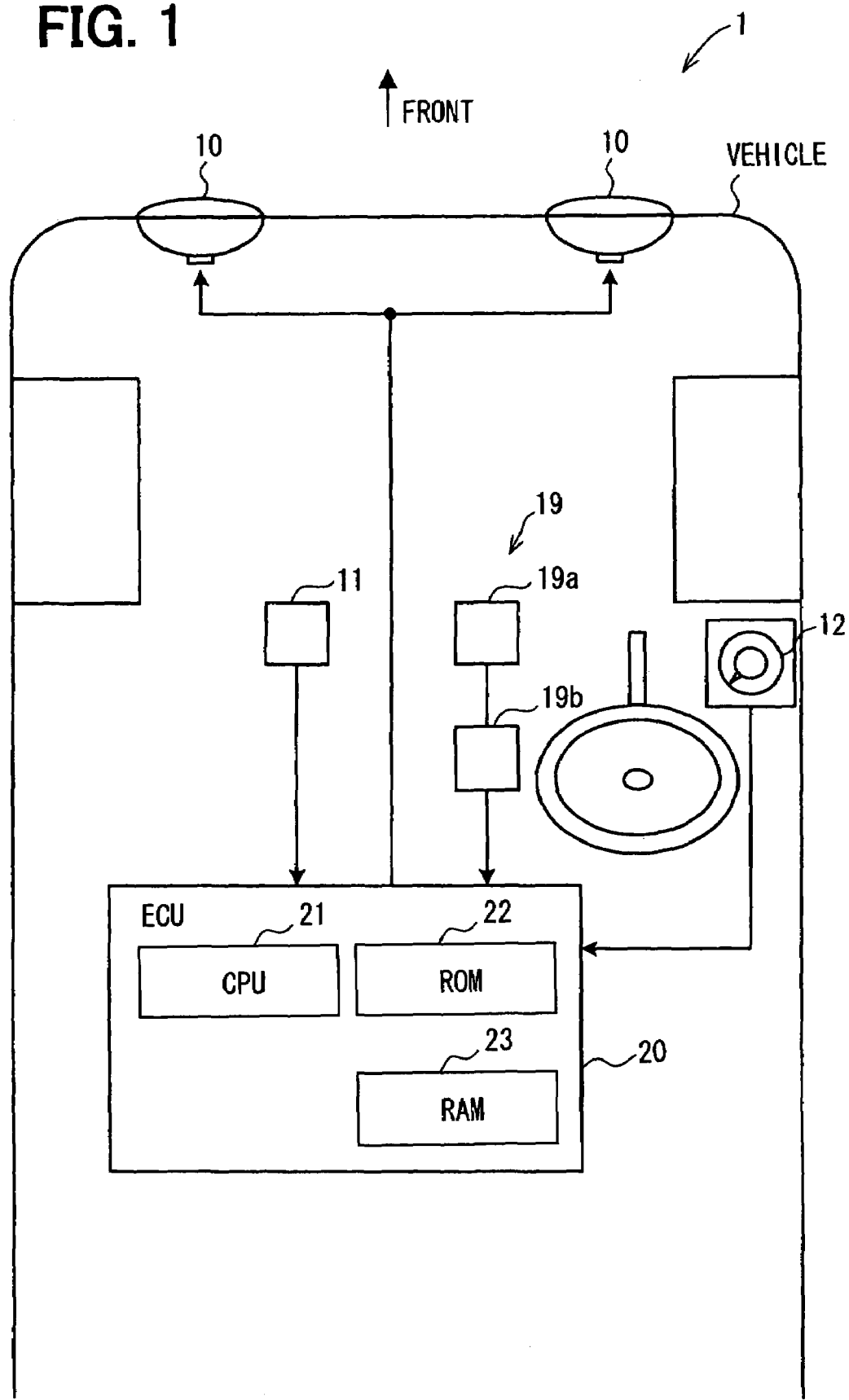
FIG. 1 is a block diagram showing a system configuration of an automatic lighting device according to an embodiment of the invention.
Figure 2:
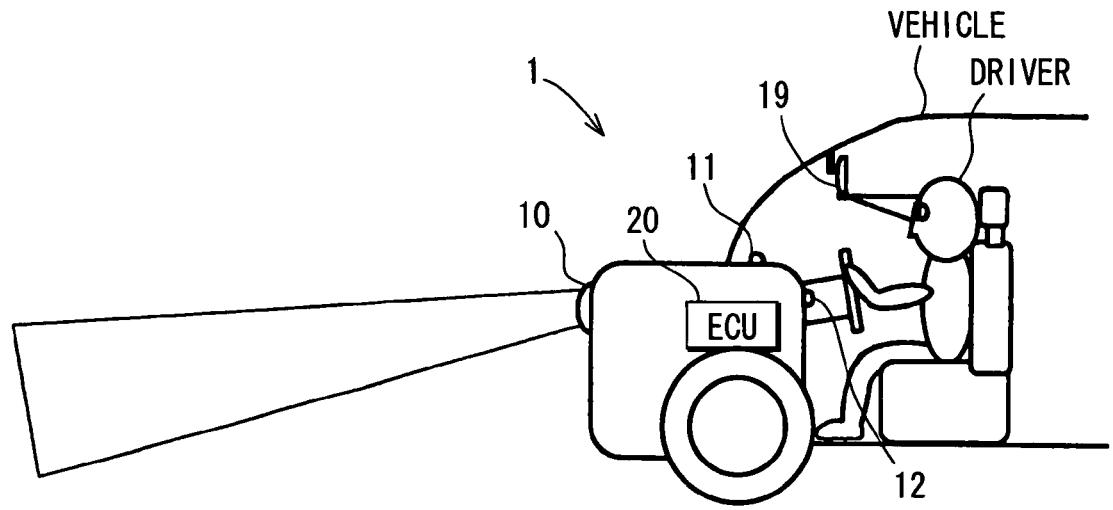
FIG. 2 is a side view showing an arrangement of each parts of a vehicle equipped with the automatic lighting device.

The automatic lighting device 1 includes vehicular lights 10, an illuminance sensor 11, an automatic lighting switch 12, an eye camera 19 and an ECU 20, as shown in FIG. 1.

The vehicle lights 10 are lamps provided in the vehicle including headlamps provided at front part of the vehicle, and/or tail lamps provided at a rear part of the vehicle.

The illuminance sensor 11 is a sensor device arranged in the vicinity of an windshield in a vehicle compartment, and functions as an illuminance detector.

Figure 3:
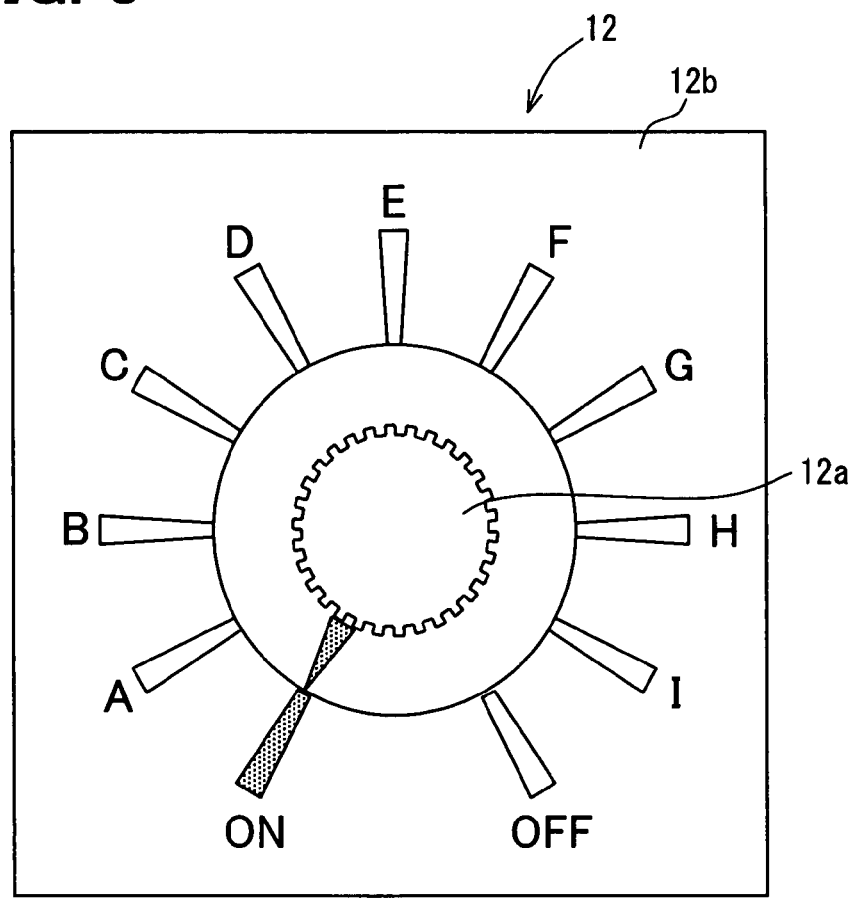
FIG. 3 is a schematic diagram showing a configuration of an automatic lighting switch.

The automatic lighting switch 12 arranged in the vicinity of a driver's seat is a dial switch that is operated by a driver to change a mode of the automatic lighting device 1, and functions as a threshold setting operation element. As shown in FIG. 3, the automatic lighting switch 12 includes a switch 12a which can be operated with fingers, and a dial plate 12b which provides characters indicating the modes. On the dial plate 12b, each characters of ON, A, B, C, D, E, F, G, H, I and OFF is provided. By rotating the switch 12a to be located at one of the characters on the dial plate 12b, a mode corresponding to the character is set.

Specifically, by setting the switch 12a at one of positions of ON and A to I, an automatic lighting mode is turned on, and the vehicular lights 10 are automatically tuned on/off. When the switch 12a is set at the position of ON, the mode becomes an automatic setting mode. In the automatic setting mode, an illuminance threshold T is automatically set in accordance with a driver's iris color (e.g., black, dark brown, brown, light brown, green, blue, light blue, dark gray and light gray) detected with the eye camera 19. The illuminance threshold T is a threshold for a decision whether the external illuminance is a level to automatically turn on the vehicular lights 10 or not. When the switch 12a is set at one of positions of A to I, the mode becomes a manual setting mode in which the illuminance threshold T is set in accordance with a switch location.

When the switch 12a is set at the position of OFF, the automatic lighting mode is turned off, and the vehicular lights 10 are not automatically turned on/off. Therefore, the driver needs to turn on/off by a manual operation of a vehicular light switch (not shown).

The eye camera 19 arranged at a front upper part of the driver's seat is a device that detects the driver's iris color and outputs a detecting result as a signal, and functions as a driver's characteristics detector, an iris color detector, and a camera. The eye camera 19 includes an imaging part 19a and a color detecting part 19b. The imaging part 19a is composed of, for example, a CCD element, and images a picture of driver's eyes. The color detecting part 19b detects the iris color in accordance with the iris picture imaged with the imaging part 19a, and outputs the detecting result as a signal.

The ECU 20 includes a CPU 21 as a central processor which executes a various arithmetic processing, a ROM 22 for storing a control program, and a RAM 23 for storing various data. The ECU 20 functions as a control circuit for controlling turning on/off the vehicular lights 10. As shown in FIG. 1, the ECU 20 is respectively input output signals of the illuminance sensor 11 and the eye camera 19. The CPU 21 functions as a light controller, a threshold setting element and a threshold optimizing element according to the invention.

Figure 4:
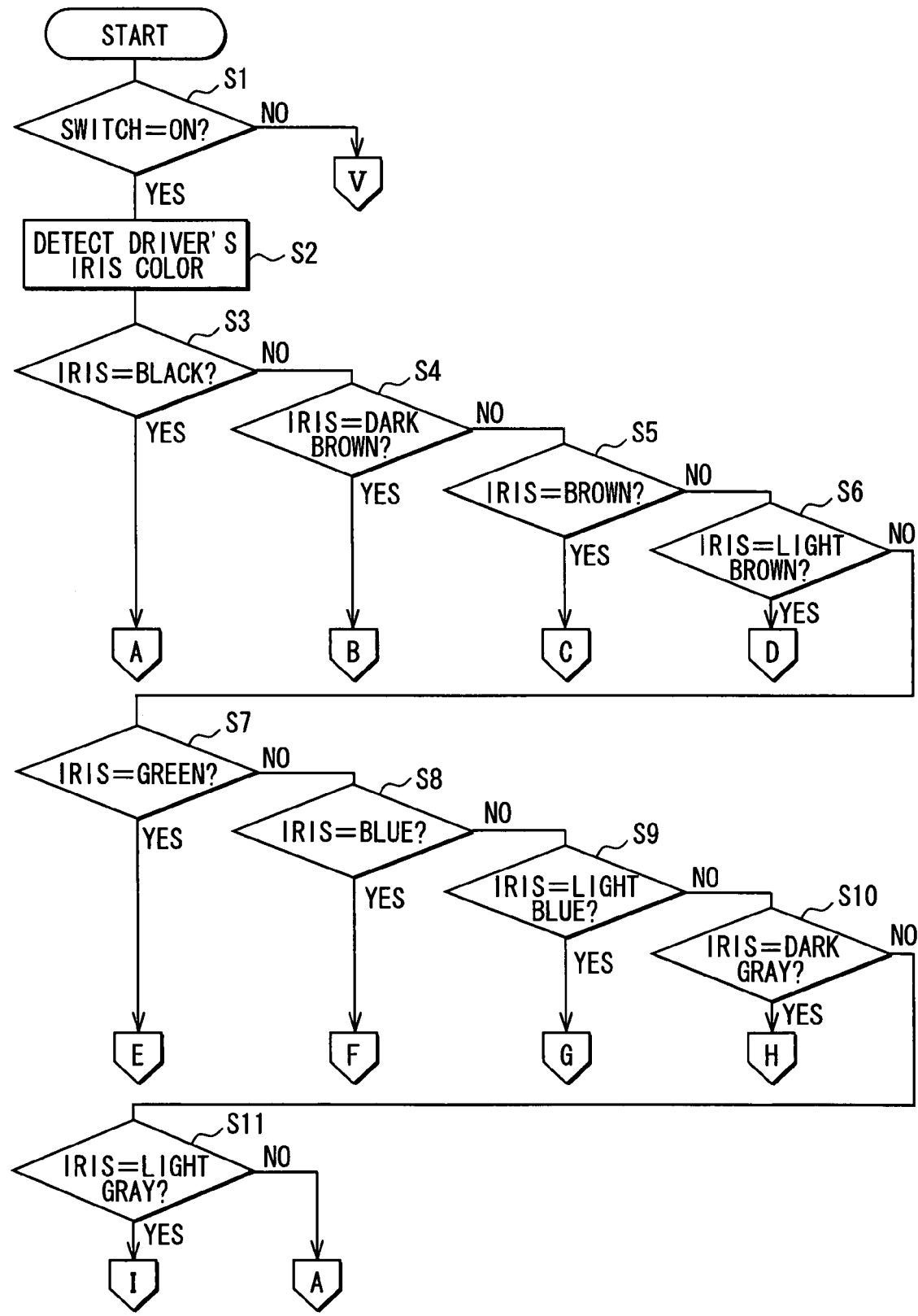
FIG. 4 is a flow chart showing a flow of an illuminance threshold setting process.
Figure 5:
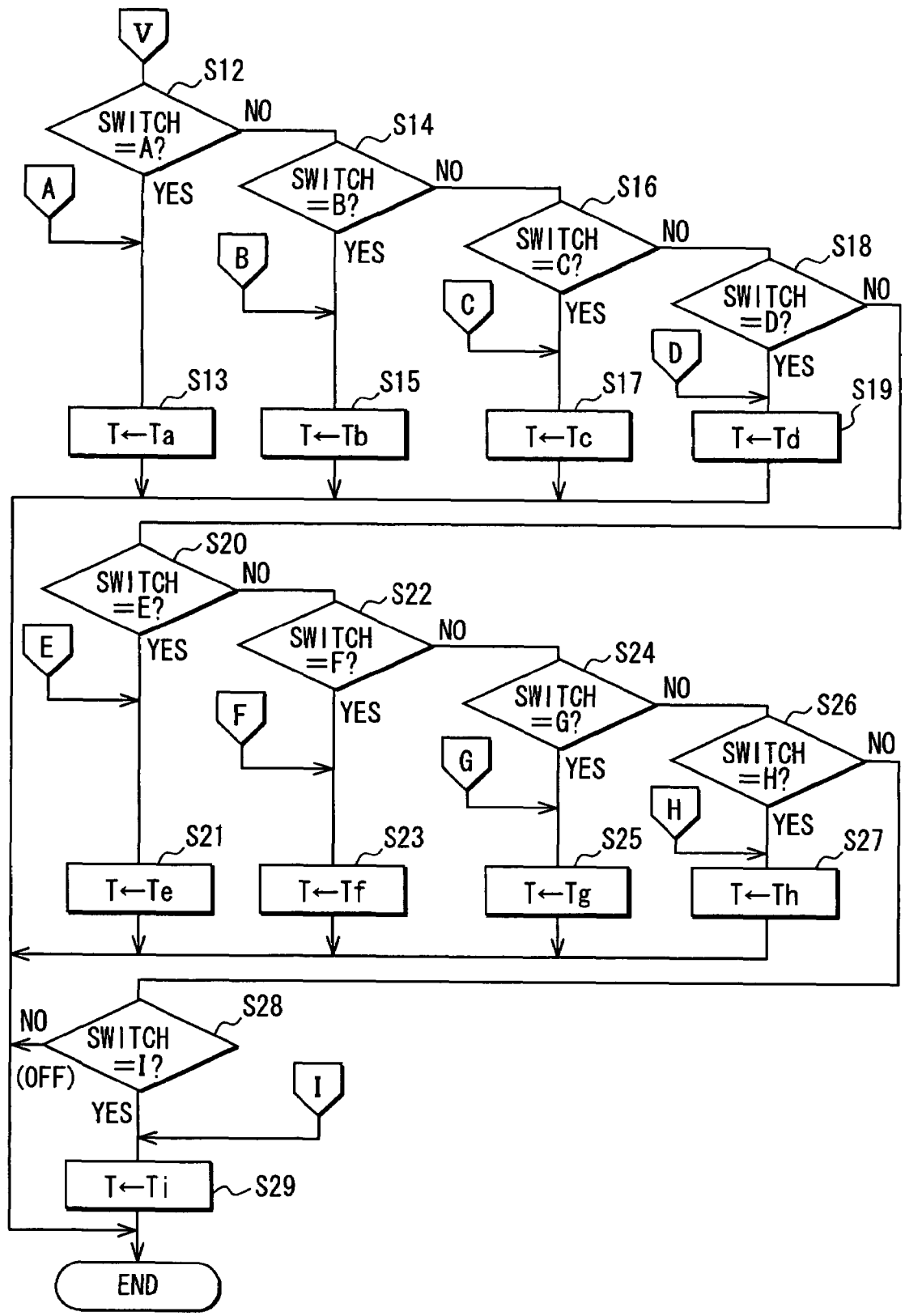
FIG. 5 is a flow chart after the steps in FIG. 4 showing the flow of the illuminance threshold setting process.

A flow of an illuminance threshold setting process executed by the CPU 21 in the ECU 20 is described with referring to flow charts in FIG. 4 and FIG. 5. The illuminance threshold setting process described a content of the flow charts in FIG. 4 and FIG. 5 is stored in the ROM 22, and the CPU 21 reads out the program from the ROM 22 and executes at a predetermined timing. For example, the CPU 21 may execute the illuminance threshold setting program at a predetermined interval.

In the flow charts in FIG. 4 and FIG. 5, the illuminance threshold setting process is started with a decision whether the location of the switch 12a of the automatic lighting switch 12 (hereafter referred as a switch location) is at a position of ON or not (Step S1). When the switch location is at the position of ON (i.e., in Step S1, it is decided to be "Yes"), the driver's iris color is detected with the eye camera 19 (S2).

Next, in Step S3, it is decided whether the iris is black or not. When the iris is black (S3: Yes), the illuminance threshold T is set to a predetermined value Ta (S13), and the routine ends. When the iris is not black (S3: No), it goes to Step S4, and it is decided whether the iris is dark brown or not. When the iris is dark brown (S4: Yes), the illuminance threshold T is set to a predetermined value Tb (S15), and the routine ends. When the iris is not dark brown (S4: No), it goes to Step S5, and it is decided whether the iris is brown or not. When the iris is brown (S5: Yes), the illuminance threshold T is set to a predetermined value Tc (S17), and the routine ends. When the iris is not brown (S5: No), it goes to Step S6, and it is decided whether the iris is light brown or not. When the iris is light brown (S6: Yes), the illuminance threshold T is set to a predetermined value Td (S19), and the routine ends. When the iris is not light brown (S6: No), it goes to Step S7, and it is decided whether the iris is green or not. When the iris is green (S7: Yes), the illuminance threshold T is set to a predetermined value Te (S21), and the routine ends.

When the iris is not green (S7: No), it goes to Step S8, and it is decided whether the iris is blue or not. When the iris is blue (S8: Yes), the illuminance threshold T is set to a predetermined value Tf (S23), and the routine ends. When the iris is not blue (S8: No), it goes to Step S9, and it is decided whether the iris is light blue or not. When the iris is light blue (S9: Yes), the illuminance threshold T is set to a predetermined value Tg (S25), and the routine ends. When the iris is not light blue (S9: No), it goes to Step S10, and it is decided whether the iris is dark gray or not. When the iris is dark gray (S10: Yes), the illuminance threshold T is set to a predetermined value Th (S27), and the routine ends. When the iris is not dark gray (S10: No), it goes to Step S1, and it is decided whether the iris is light gray or not. When the iris is light gray (S11: Yes), the illuminance threshold T is set to a predetermined value Ti (S29), and the routine ends. When the iris is not light gray (S11: No), it goes to Step S13. The illuminance threshold T is set to the predetermined value Ta, and the routine ends.

When the switch location is not at the position of ON in Step S1 (S1: No), it goes to Step S12, and it is decided whether the switch indicates the position of A or not. When the switch indicates the position of A (S12: Yes), the illuminance threshold T is set to the predetermined value Ta (S13), and the routine ends. When the switch does not indicate the position of A (S12: No), it goes to Step S14, and it is decided whether the switch indicates the position of B or not. When the switch indicates the position of B (S14: Yes), the illuminance threshold T is set to the predetermined value Tb (S15), and the routine ends. When the switch does not indicate the position of B (S14: No), it goes to Step S16, and it is decided whether the switch indicates the position of C or not. When the switch indicates the position of C (S16: Yes), the illuminance threshold T is set to the predetermined value Tc (S17), and the routine ends. When the switch does not indicate the position of C (S16: No), it goes to Step S18, and it is decided whether the switch indicates the position of D or not. When the switch indicates the position of D (S18: Yes), the illuminance threshold T is set to the predetermined value Td (S19), and the routine ends. When the switch does not indicate the position of D (S18: No), it goes to Step S20, and it is decided whether the switch indicates a position of E or not. When the switch indicates the position of E (S20: Yes), the illuminance threshold T is set to the predetermined value Te (S21), and the routine ends.

When the switch does not indicate the position of E (S20: No), it goes to Step S22, and it is decided whether the switch indicates the position of F or not. When the switch indicates the position of F (S22: Yes), the illuminance threshold T is set to the predetermined value Tf (S23), and the routine ends. When the switch does not indicate the position of F (S22: No), it goes to Step S24, and it is decided whether the switch indicates the position of G or not. When the switch indicates the position of G (S24: Yes), the illuminance threshold T is set to the predetermined value Tg (S24), and the routine ends. When the switch does not indicate the position of G (S24: No), it goes to Step S26, and it is decided whether the switch indicates the position of H or not. When the switch indicates the position of H (S26: Yes), the illuminance threshold T is set to the predetermined value Th (S27), and the routine ends. When the switch does not indicate the position of H (S26: No), it goes to Step S28, and it is decided whether the switch indicates the position of I or not. When the switch indicates the position of I (S28: Yes), the illuminance threshold T is set to the predetermined value Ti (S29), and the routine ends. When the switch does not indicate the position of I (S29: No), the routine ends.

In the embodiment, a relationship of the predetermined values Ta to Ti is set to Ta>Tb>Tc>Td>Te>Tf>Tg>Th>Ti.

Figure 6:
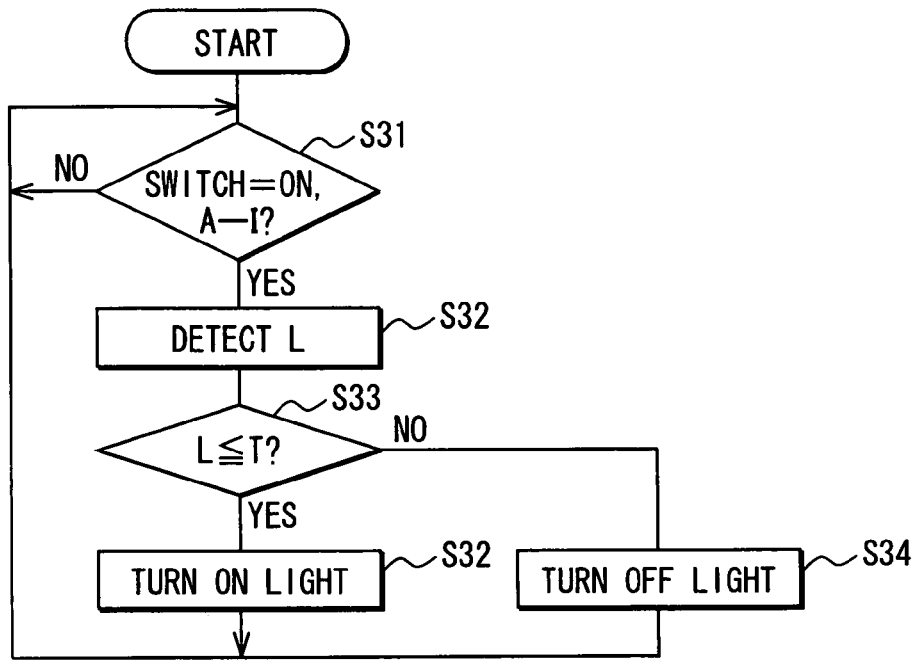
FIG. 6 is a flow chart showing a flow of an automatic turning on/off process of vehicular lights.

Next, a flow of an automatic turning on/off process of the vehicular lights 10 is described with referring to a flow chart in FIG. 6. The illuminance threshold setting process described a content of the flow chart in FIG. 6 is stored in the ROM 22, and the CPU 21 reads out the program from the ROM 22 and executes at a predetermined interval.

In the flow chart in FIG. 6, at first, it is decided whether the switch location is one of positions of ON and A to I or not (S31). When the switch location is one of ON and A to I (S31: Yes), an external illuminance L is detected with the illuminance sensor 11 (S32). Then, it is decided whether the external illuminance L is not more than the illuminance threshold T (S33). When the external illuminance L is not more than the illuminance threshold T (S33: Yes), the vehicular lights 10 are turned on, and it returns to Step S31. On the other hand, when the external illuminance L is more than the illuminance threshold T (S33: No), the vehicular lights 10 are turned off, and it returns to Step S31. When the switch location is not one of positions of ON and A to I, i.e., when the switch location is at the position of OFF (S31: No), it returns to Step S31.

Figure 7:
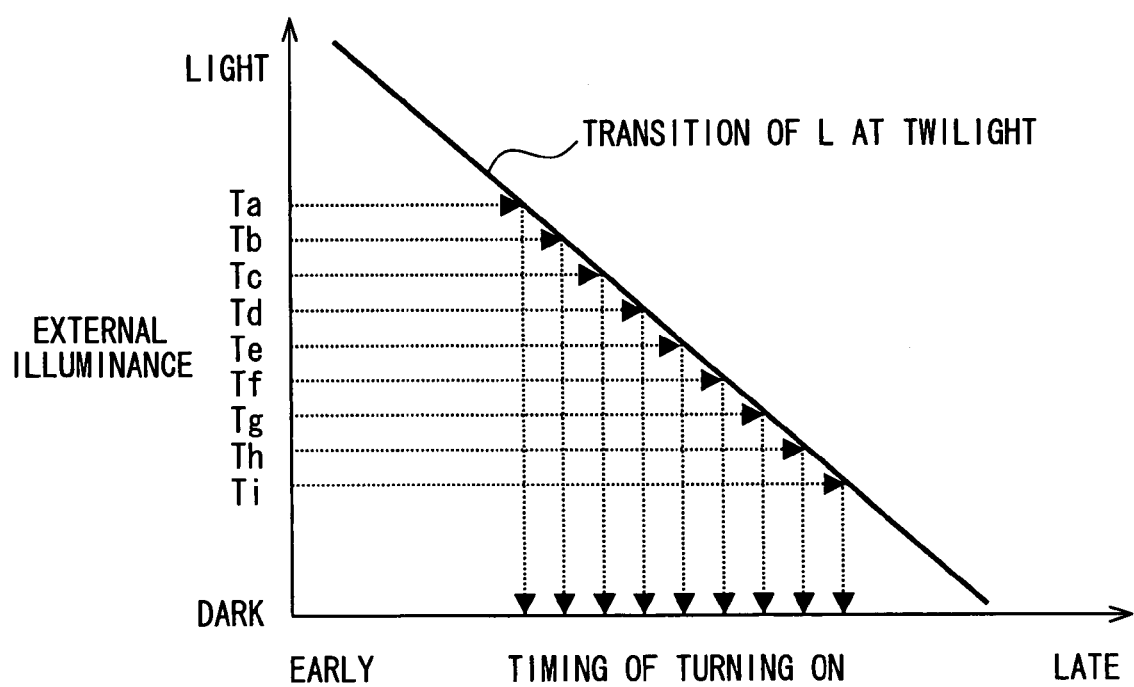
FIG. 7 is a graph showing a relationship between a value of the illuminance threshold at twilight and a timing of turning on the vehicular lights.

A relationship between a value of the illuminance threshold at twilight and a timing of turning on the vehicular lights 10 is described with referring to a graph in FIG. 7. As shown in FIG. 7, the timing of turning on becomes the earliest when the illuminance threshold T=Ta, gradually becomes late in order of Tb, Tc, Td, Te, Tf, Tg, and Th, and becomes the latest when the illuminance threshold T=Ti.

Therefore, in the automatic setting mode, that is, when the switch location of the automatic lighting switch 12 is at the position of ON, the timing of turning on becomes the earliest when the driver's iris color is black, gradually becomes late in order of dark brown, brown, light brown, green, blue, light blue, and dark gray, and becomes the latest when the driver's iris color is light gray. On the other hand, in the manual setting mode, i.e., when the switch location of the automatic lighting switch 12 is at one of positions of A to I, the timing of turning on becomes the earliest when the switch location is at the position of A, gradually becomes late in order of B, C, D, E, F, G and H, and becomes the latest when the switch location is at the position of I.

As described above, when the switch location of the automatic lighting switch 12 is at the position of ON, the eye camera 19 as the iris color detector detects the iris color as the information about the driver's physical characteristics, and the CPU 21 as the threshold setting element sets the illuminance threshold T in accordance with the iris color detected with the eye camera 19. Therefore, the automatic lighting device 1 according to the embodiment can turn on the vehicular lights 10 at an appropriate timing in accordance with the iris color that is closely related to a night vision. Especially, the illuminance threshold T is set in such manner that the threshold is low when the iris color is light, and the threshold is high when the iris color is dark. Therefore, when the driver has a light iris color and an excellent night vision, the automatic lighting device does not turn on the vehicular lights 10 until late night. On the other hand, when the driver has a dark iris color and a less-excellent night vision, the automatic lighting device turn on the vehicular light 10 at early twilight.

Furthermore, by changing the switch location of the automatic lighting switch 12 as the threshold setting operation element at one of positions of A to I, the illuminance threshold T is set by the driver's manual operation. Therefore, the vehicular lights 10 can be turned on according to a driver's preference at twilight, for example.

Other Embodiments

When the vehicular lights 10 is turned on by the driver's manual operation, the illuminance sensor 11 may detect the external illuminance and CPU 21 may optimize the illuminance threshold T in accordance with the external illuminance detected with the illuminance sensor 11.

Figure 8:
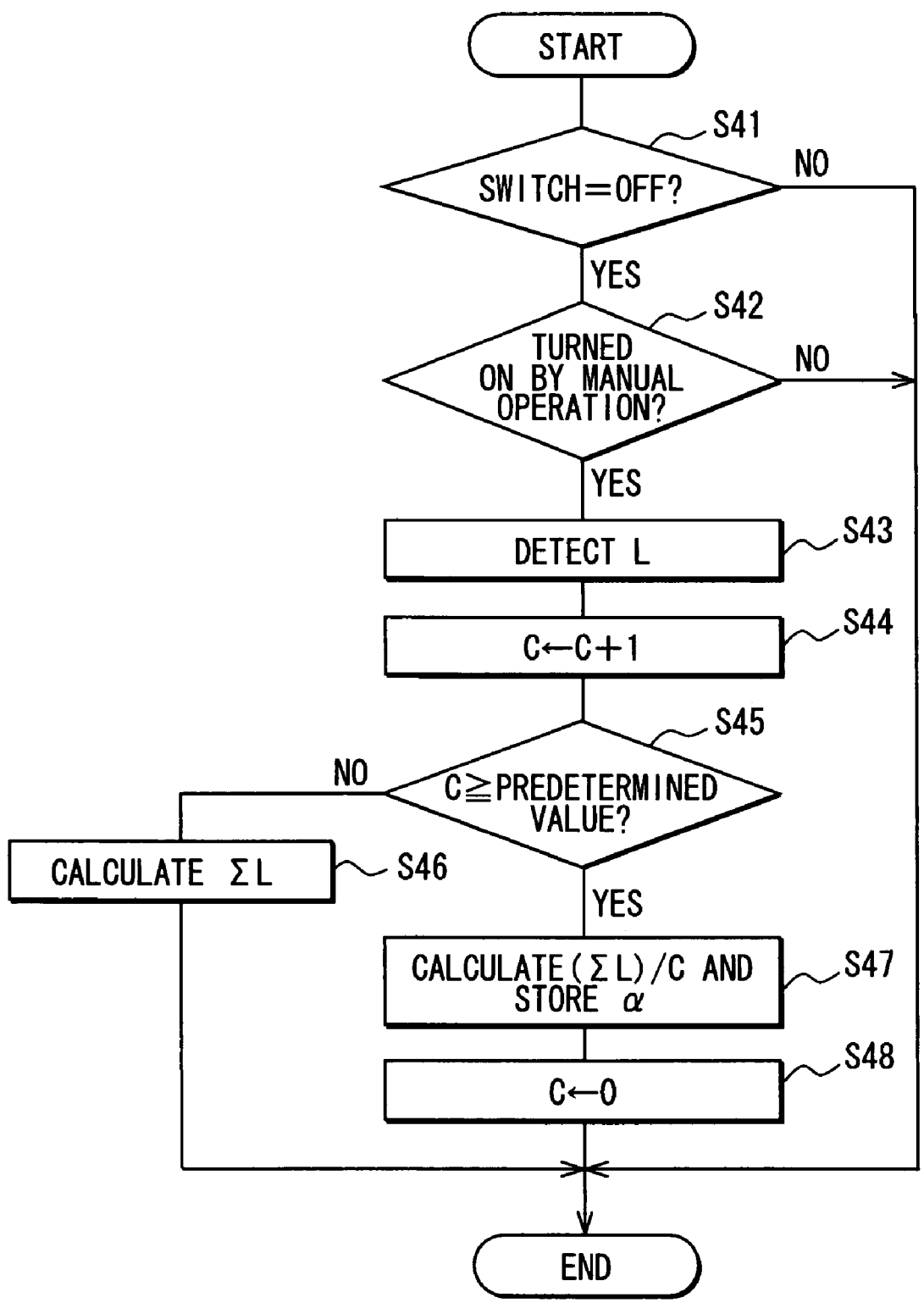
FIG. 8 is a flow chart showing a flow of a calculation process of an optimal value according to a modification of the automatic lighting device.

As shown in FIG. 8, an illuminance threshold optimizing process is started with a decision whether the switch location of the automatic lighting switch 12 is at the position of OFF or not (S41). When the switch location is at the position of OFF (S41: Yes), it is decided whether the vehicular lights 10 are turned on by the manual operation or not (S42). When the vehicular light 10 are tuned on by the manual operation (S42: Yes), the external illuminance L is detected with the illuminance sensor 11 (S43), one is added to a counter number C. An initial value of the counter value C is zero. Then, it is decided whether the counter value C is not less than a predetermined value (a positive integer, for example, five) (S45). When the counter value C is less than the predetermined value (S45: No), a cumulative value $\Sigma L$ of the external illuminance L is calculated (S46), and the routine ends. On the other hand, when the counter value C is not less than the predetermined value (S45: Yes), an average value of the external illuminance L when the driver turns on the vehicular lights 10 by the manual operation is calculated, and the average value is stored in the RAM 23 (S47). Specifically, the average value of the external illuminance L is calculated by dividing the cumulative value $\Sigma L$ of the external illuminance L by the counter value C, and the average value is stored in the RAM 23 as an optimal value $\alpha$. Then, the counter value C is set to zero (S43), the routine ends.

When the switch is not located at a position of OFF, i.e., when the switch location is at one of positions of ON and A to I in Step S41 (S41: No), and when the vehicular lights 10 are not tuned on by the manual operation in Step 42 (S42: No), the routine ends.

Figure 9:
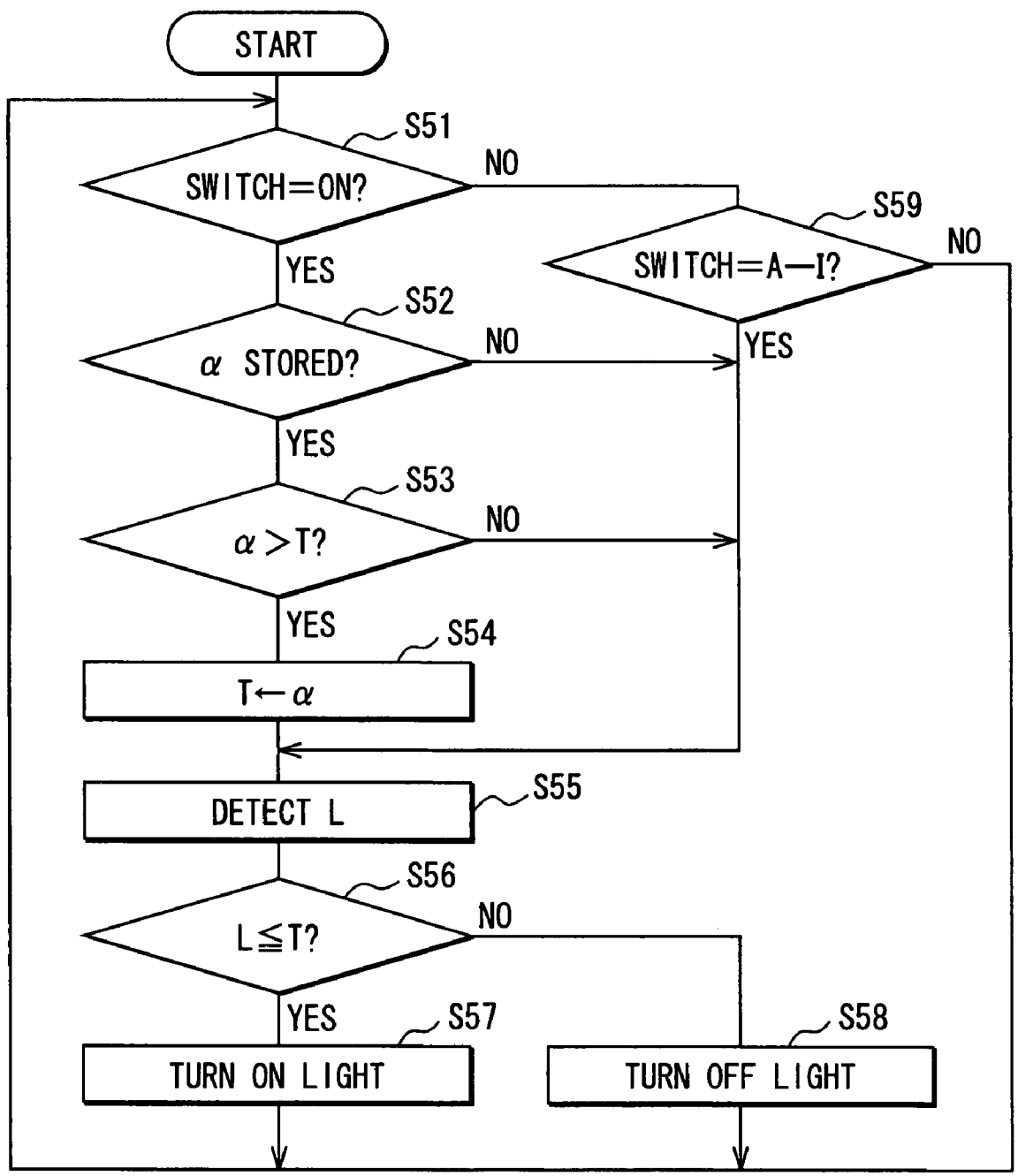
FIG. 9 is a flow chart showing a flow of the automatic turning on/off process of the vehicular lights according to the modification of the automatic lighting device.

As shown in FIG. 9, a turning on/off process according to the modification is started with a decision whether the switch location is at a position of ON or not (S51). When the switch location is ON (S51: Yes), it goes to Step S52, and it is decided whether the optimal value a is stored in the RAM 23 or not. When the optimal value a is stored in the RAM 23 (S52: Yes), it goes to Step 53, and it is decided whether the optimal value a is more than the illuminance threshold T or not. When the optimal value a is more than the illuminance threshold T (S53: Yes), the illuminance threshold T is optimized and set to the optimal value a (S54). Then, the external illuminance L is detected with the illuminance sensor 11 (S55), and it is decided whether the external illuminance L is not more than the illuminance threshold T (S56). When the external illuminance L is not more than the illuminance threshold T (S56: Yes), the vehicular lights 10 are turned on (S57), and it retunes to Step S51. On the other hand, when the external illuminance is more than the illuminance threshold T (S56: No), the vehicular lights 10 are tuned off (S58), and it returns to Step S51.

In Step S51, when the switch location is not at position of ON (S51: No), it goes to Step S59, and it is decided whether the switch location is at one of position of A to I. When the switch location is at one of A to I (S59: Yes), a process after Step S55 is executed. When the optimal value a is not stored in the RAM 23 (S52: No), and when the optimal value a is not more than the illuminance threshold T (S53: No), the process after Step S55 is executed.

When the switch location is not at any positions of A to I, i.e., when the switch location is at the position of OFF (S59: No), it returns to Step S51.

According to the modification, when the switch location is at the position of ON (in the automatic setting mode), in the illuminance threshold optimizing process, the illuminance threshold T is optimized with the optimal value a which is the average of the external illuminance L when the vehicular lights 10 are turned on by the manual operation. Therefore, the vehicular lights 10 can be turned on/off at appropriate timing in accordance with the driver's preference.

Furthermore, in the above-described embodiment, the driver's iris color is detected with the eye camera 19 as the information about the driver's physical characteristics, and the illuminance threshold T is changed in accordance with the iris color. Alternatively, a portion of the driver's body (e.g., face, upper body and entire body) may be imaged with the CCD camera, information about the driver's physical characteristics (e.g., age and with or without glasses) is acquired based on the image of the CCD camera, and the illuminance threshold T is set in accordance with the driver's physical characteristics. For example, when the driver is identified with an elderly person, the illuminance threshold T may be set to be higher than the usual. According to the setting, when the driver is the elderly person, the vehicular lights 10 are tuned on at earlier timing than the usual at twilight. Therefore, the elderly person having a less-excellent night vision can be prevented from a traffic accident. In addition, when the driver wears glasses, the illuminance threshold T may be set to be higher than the usual. According to the setting, when the driver wears the glasses, the vehicular lights 10 are tuned on at earlier timing than when driver does not wear glasses. Therefore, a person wearing glasses and having a less-excellent night vision can be prevented from a traffic accident.

Such changes and modifications are to be understood as being within the scope of the present invention as defined by the appended claims.

What is claimed is:

1. An automatic lighting device comprising:
   an illuminance detector for detecting an external illuminance around a vehicle;
   a light controller for turning on/off a vehicular light to illuminate an outside of the vehicle, wherein the light controller turns on the vehicular light when the external illuminance is not more than an illuminance threshold;
   a driver's characteristics detector for acquiring information about a driver's physical characteristics; and
   a threshold setting element for setting the illuminance threshold in accordance with the driver's physical characteristics.

2. The automatic lighting device according to claim 1, wherein
   the driver's characteristics detector includes an iris color detector for detecting a driver's iris color, and
   the threshold setting element sets the illuminance threshold in accordance with the iris color.

3. The automatic lighting device according to claim 2, wherein
   the threshold setting element sets the illuminance threshold in such manner that the threshold is low when the iris color is light and the threshold is high when the iris color is dark.

4. The automatic lighting device according to claim 1, wherein
   the driver's characteristics detector includes an age information detector for acquiring a driver's age information, and
   the threshold setting element sets the illumination threshold in accordance with the driver's age.

5. The automatic lighting device according to claim 1, wherein
   the driver's characteristics detector includes a camera that images at least a portion of the driver's body and
   the driver's characteristics detector acquires the information about the driver's physical characteristics in accordance with the image of the camera.

6. The automatic lighting device according to claim 1, further comprising
   a threshold optimizing element that optimizes the illuminance threshold in accordance with the external illuminance when the driver turns on the vehicular lights by a manual operation.

7. The automatic lighting device according to claim 1, further comprising
   a threshold setting operation element for setting the illuminance threshold by a driver's manual operation.

8. A method for controlling a vehicular light to illuminate an outside of a vehicle, the method comprising:
   detecting an external illuminance around a vehicle;
   turning on the vehicular light when the external illuminance is not more than an illuminance threshold;
   acquiring information about a driver's physical characteristics; and
   setting the illuminance threshold in accordance with the driver's physical characteristics.

9. The method for controlling the vehicular light according to claim 8, wherein
   the driver's physical characteristics includes a driver's iris color, and
   the illuminance threshold is set in accordance with the driver's iris color.

10. The method for controlling the vehicular light according to claim 9, wherein
    the illuminance threshold is set in such a manner that the threshold is low when the iris color is light and the threshold is high when the iris color is dark.

11. The method for controlling the vehicular light according to claim 8, wherein
    the driver's physical characteristics includes a driver's age, and
    the illuminance threshold is set in accordance with the driver's age.

12. The method for controlling the vehicular light according to claim 8, further comprising imaging at least a portion of the driver's body with a camera, and wherein the information about the driver's physical characteristics is acquired in accordance with the image of the camera.

13. The method for controlling the vehicular light according to claim 8, further comprising optimizing the illuminance threshold in accordance with the external illuminance when the driver turns on the vehicular light by a manual operation.

14. The method for controlling the vehicular light according to claim 8, further comprising setting the illuminance threshold by the driver's manual operation.

15. An automatic lighting device comprising:

an illuminance detector for detecting an external illuminance around a vehicle;

a light controller for turning an exterior light of the vehicle on when the exterior illuminance is below a specified threshold;

a driver's characteristic detector for acquiring information about a driver's physical characteristic; and a threshold setting element for setting the specified threshold based on the driver's physical characteristic.

16. The automatic lighting device according to claim 15, wherein the driver's characteristic is an iris color.

17. The automatic lighting device according to claim 15, wherein the driver's characteristic is a driver's age information.

* * * * *